E. R. JOHNSON.
TALKING MACHINE.
APPLICATION FILED DEC. 13, 1912.
1,235,695.
Patented Aug. 7, 1917.
3 SHEETS—SHEET 1.
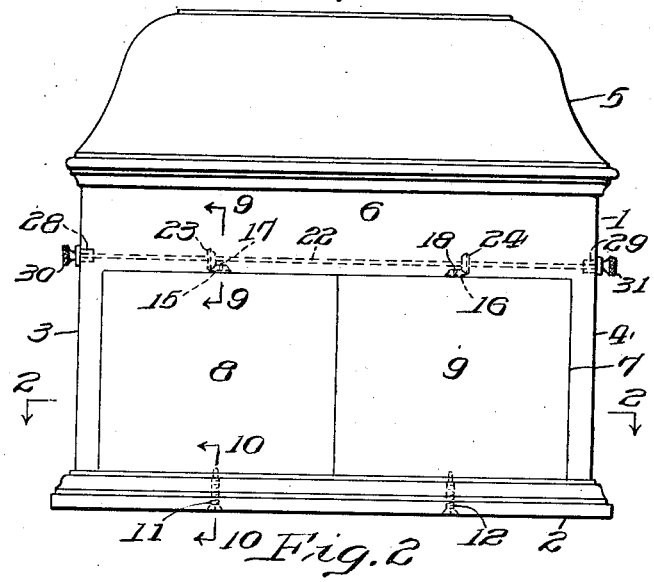
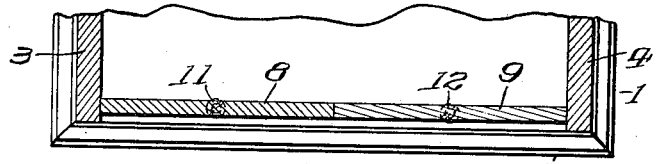
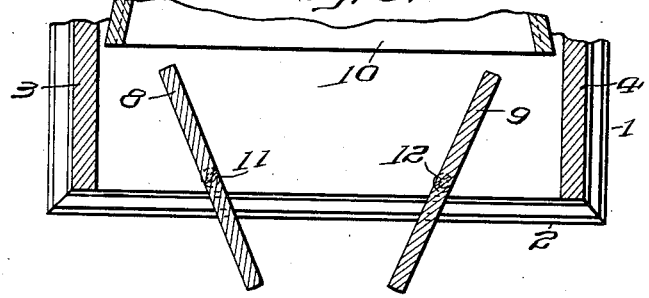
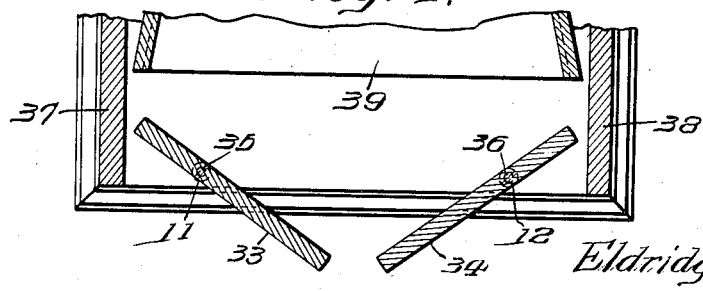
WITNESSES
INVENTOR
Eldridge R. Johnson.
BY
ATTORNEY

E. R. JOHNSON.
TALKING MACHINE.
APPLICATION FILED DEC. 13, 1912.

1,235,695.

Patented Aug. 7, 1917.
3 SHEETS—SHEET 2.

INVENTOR
Eldridge R. Johnson.

WITNESSES

BY

ATTORNEY

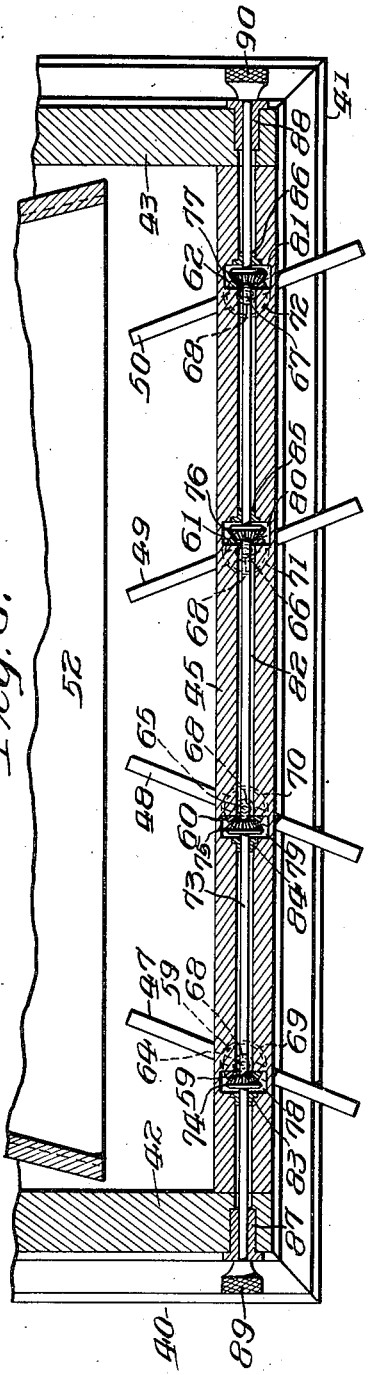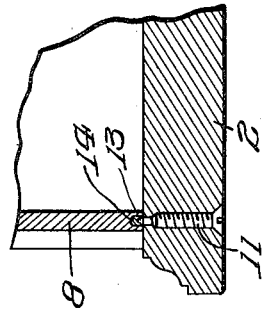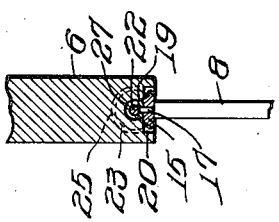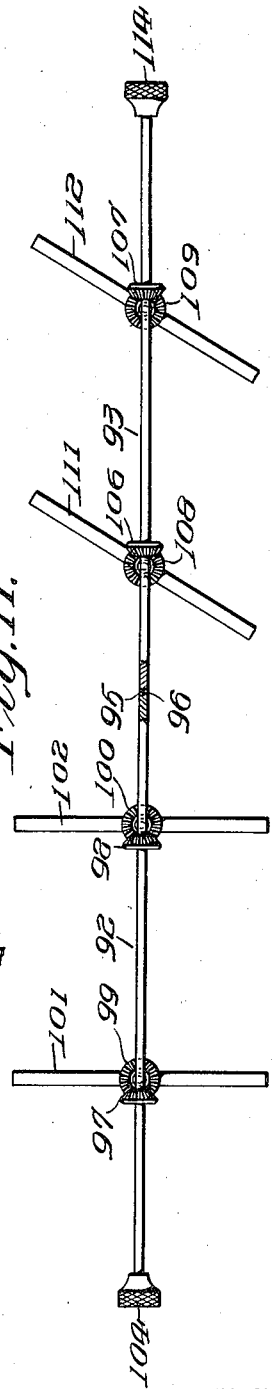

UNITED STATES PATENT OFFICE.

ELDRIDGE R. JOHNSON, OF MERION, PENNSYLVANIA, ASSIGNOR TO VICTOR TALKING MACHINE COMPANY, A CORPORATION OF NEW JERSEY.

TALKING-MACHINE.

1,235,695. Specification of Letters Patent. Patented Aug. 7, 1917.

Application filed December 13, 1912. Serial No. 736,475.

*To all whom it may concern:*

Be it known that I, ELDRIDGE R. JOHNSON, a citizen of the United States, and a resident of Merion, county of Montgomery, State of Pennsylvania, have invented certain new and useful Improvements in Talking-Machines, whereof the following is a specification, reference being had to the accompanying drawings.

This invention particularly relates to adjustable closures for varying the area of, and otherwise controlling the sound outlet aperture of a talking machine having an inclosed sound amplifier.

The principal objects of this invention are, to provide a talking machine having an inclosed amplifier, with a closure formed of pivoted doors or shutters for controlling the sound emitted from the mouth of the amplifier; and to provide means operatively connecting said doors or shutters for contemporaneously effecting their relative movement oppositely into selected relatively angular positions.

Other objects of this invention are, to provide a talking machine with doors or shutters pivoted on substantially vertical axes, and arranged to deflect the sounds emitted from the sound amplifier, laterally in substantially horizontal planes; and to provide concealed means connected to turn one or more shutters in one direction, contemporaneously with the turning of another or other shutters in an opposite direction upon their respective pivotal axes.

Further objects of this invention are, to provide a talking machine having pivoted doors or shutters, with means operatively connecting selected doors or shutters, and means to contemporaneously effect the actuation of the doors or shutters of each set or group of selected doors or shutters independently upon their respective axes of rotation.

This invention also comprehends a talking machine having doors or shutters pivoted eccentrically and connected to be contemporaneously actuated in opposite directions into different relatively angular positions.

This invention further includes all of the various novel features of construction and arrangement hereinafter more definitely specified.

Figure 5:
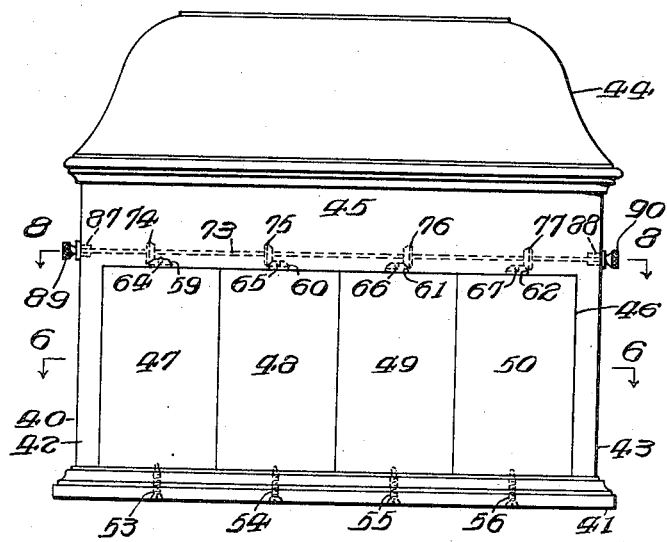
Figure 6:
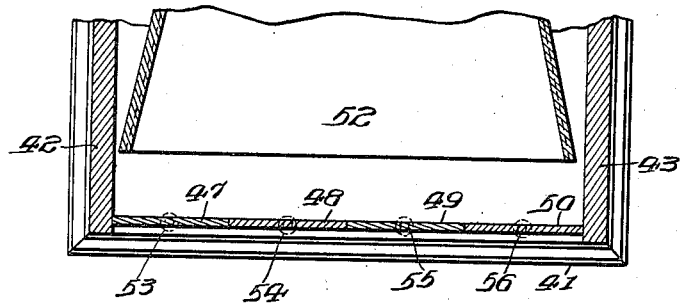
Figure 7:
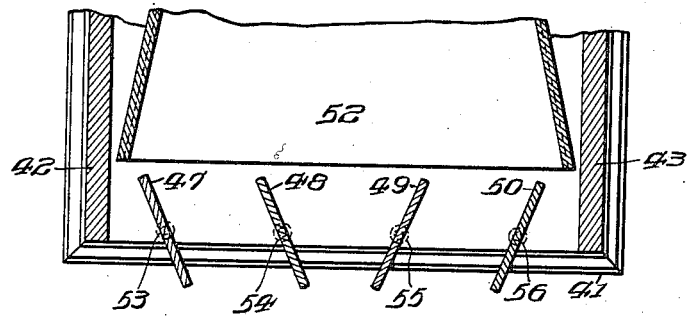

In the accompanying drawings, Figure 1 is a front elevational view of a well known type of talking machine provided with doors or shutters connected to be actuated in accordance with this invention; Fig. 2 is a fragmentary plan sectional view of the front portion of said machine taken on the line 2—2 in Fig. 1; Fig. 3 is a fragmentary plan sectional view similar to Fig. 2, but showing the doors or shutters rotated on their respective axes to their partially open position; Fig. 4 is a fragmentary plan sectional view similar to Fig. 3, showing a slightly modified arrangement of the pivoted doors or shutters; Fig. 5 is a front elevational view of a talking machine provided with a convenient embodiment of a modification of this invention; Fig. 6 is a fragmentary plan sectional view of the front portion of the machine shown in Fig. 5, taken on the line 6—6 in said figure; Fig. 7 is a fragmentary plan sectional view similar to Fig. 6, but showing the shutters rotated on their respective axes to their partially open position; Fig. 8 is an enlarged fragmentary plan sectional view, showing the means for operatively connecting the shutters, taken on the line 8—8 in Fig. 5, but showing the shutters rotated to an open position; Fig. 9 is a fragmentary transverse vertical sectional view taken through the upper shutter bearing on the line 9—9 in Fig. 1; Fig. 10 is a fragmentary sectional view taken through the lower shutter bearing, on the line 10—10 in Fig. 1; and Fig. 11 is a diagrammatic or skeletonized plan view, partly in section, showing the means for independently actuating selected groups of shutters.

In said figures, the talking machine selected for illustration comprises a cabinet 1, having the base 2, side walls 3 and 4, lid 5, and front wall 6, the latter being provided with the sound outlet orifice 7, having snugly fitted therein the pivoted doors or shutters 8 and 9 forming a closure therefor and arranged to be rotated on their respective pivotal axes, as hereinafter described, to control the sound emitted from the amplifier 10 within the casing, as shown in Fig. 3.

The shutters 8 and 9 are respectively supported for rotation upon the adjustable bearing screws 11 and 12, which, as shown in Fig. 10, may be inserted through a base 2 of the cabinet 1, in threaded engagement therewith and provided with the conical trunnions 13 fitted into similar recesses in the bearing thimbles 14, which are respectively disposed centrally in the bottom edge of the shutters 8 and 9.

The doors or shutters 8 and 9 are respectively provided with bevel or miter gears 15 and 16, which are secured to their respective trunnions 17 and 18, which project upwardly through said gears into suitable bearing bushings 19 conveniently mounted in the front wall 6 of the cabinet 1, as best shown in Fig. 9, said wall 6 being provided with suitable recesses 20 to receive the gears 15 and 16, which are invisibly disposed therein, as shown in said figure.

The shutters 8 and 9 are connected to be contemporaneously rotated about their axes, by the shaft 22, which carries the bevel or miter gears 23 and 24, which are respectively disposed in suitable recesses 25 provided therefor in the front wall 6, and which are in toothed engagement with the bevel or miter gears 15 and 16 on said shutters. The shaft 22 extends horizontally through a suitable shaft aperture 27 in the front wall 6 of the cabinet 1, and is conveniently supported in bearings 28 and 29 therein. Said shaft has its projecting extremities provided with suitable knurled knobs or thumb-wheels 30 and 31, secured thereto for conveniently rotating said shaft and thereby contemporaneously actuating said doors or shutters in relatively opposite directions of rotation.

In the form of this invention shown in Fig. 4, the doors or shutters 33 and 34 have their pivotal supports 35 and 36 eccentrically disposed, being preferably nearest to the edge adjacent to the side walls 37 and 38 of the cabinet. In this form, it will be observed, the mouth of the amplifier 39 may extend in closer proximity to the sound outlet orifice of the cabinet than in the form of the invention shown in Figs. 1 to 3, inclusive.

The form of this invention shown in Figs. 5 to 8, inclusive, comprises the cabinet 40 having the base 41, side walls 42 and 43, lid 44, and front wall 45, which latter is provided with the sound outlet aperture 46 having snugly fitted therein pivoted doors or shutters 47, 48, 49 and 50, forming a closure therefor and arranged to be rotated on their respective pivotal axes, as hereinafter described, to control the sound omitted from the amplifier 52 within the cabinet 40, as best shown in Figs. 6 and 7.

The doors or shutters 47, 48, 49 and 50 are respectively supported for rotation upon the adjustable bearing screws 53, 54, 55 and 56, which, like the bearing screw 11, shown in Fig. 10, may be inserted through the base 41 of the talking machine, in threaded engagement therewith, and provided with conical bearings pivotally supporting said shutters.

The doors or shutters 47, 48, 49 and 50 are respectively provided with miter gears 59, 60, 61 and 62, which are secured to their respective trunnions 64, 65, 66 and 67, which are conveniently journaled in suitable bearing bushings 68 in the front wall 45 of the cabinet 40, similar to the bearing bushing 19 shown in Fig. 9, said wall 45 having its lower edge provided with recesses 69, 70, 71 and 72 to receive the respective gears 59, 60, 61 and 62, as shown in Fig. 8.

The shutters 47, 48, 49 and 50 are connected to be contemporaneously rotated upon their axes by the rotation of the shaft 73, which carries the miter gears 74, 75, 76 and 77, which are respectively disposed in recesses 78, 79, 80 and 81, provided therefor in the front wall 45, and which are in toothed engagement with the miter gears 59, 60, 61 and 62 on said shutters.

As shown in Figs. 5 and 8, the miter gears 74 and 75 are connected with the miter gears 59 and 60 at one side of their pivotal axes, while the miter gears 76 and 77 are connected with the miter gears 61 and 62 at the opposite side of their pivotal axes, so that, as will be readily seen, the doors or shutters 47 and 48 at one side of the center of the sound outlet aperture 46 will be actuated on their pivotal axes in one direction of rotation, contemporaneously with the actuation of the doors 49 and 50 upon their axes in the opposite direction of rotation.

The shaft 73 extends horizontally through a suitable shaft aperture 82 in the front wall 45 of the cabinet 40, and is conveniently supported, adjacent to the respective gears 74, 75, 76 and 77, by the bearings 83, 84, 85 and 86, as best shown in Fig. 8, and said shaft has the bearings 87 and 88 at the ends of said front wall 45, and has its projecting extremities provided with suitable knurled knobs or thumb-wheels 89 and 90 secured thereto, for conveniently rotating said shaft and thereby simultaneously actuating said shutters.

It has been found desirable to connect selected shutters, whereby the respective groups of shutters may be separately actuated, and for this purpose the shaft shown in Fig. 11 comprises the relatively rotatable sections 92 and 93, the section 92 having a reduced end projection forming a trunnion 95 extending into a central bore 96 forming a bearing in the abutted end of the section 93.

The shaft section 92 is conveniently provided with the miter gears 97 and 98 in toothed engagement with the miter gears 99 and 100 respectively on the doors or shutters 101 and 102, and said shaft section is conveniently provided with the knurled knob or thumb-wheel 104, by which said shaft may be conveniently rotated by the operator to effect the actuation of said doors or shutters 101 and 102. The shaft section 93 is provided with the miter gears 106 and 107 in toothed engagement with the miter gears 108 and 109 respectively on the shutters 111 and 112, and is provided with the knurled knob or thumb-wheel 114 for conveniently rotating said shaft section, to effect the actuation of the shutters 111 and 112 connected therewith into any desired position independently of the shutters 101 and 102.

It will be obvious that by providing pivoted shutters mounted to rotate about vertical axes, the horizontal field of the sound emitted by the amplifier may be greatly broadened without affecting the field vertically, and that by providing means for connecting the shutters upon opposite sides of the center of the sound outlet orifice, to effect their relative movement in opposite directions contemporaneously, the sound emitted from the mouth of the amplifier will be uniformly distributed, or, in other words, symmetrically projected.

It will be equally obvious that by providing means for separately actuating selected groups of shutters rotatable about vertical axes, the horizontal field may be directed laterally, as desired; that is to say, either to the right or the left with respect to the machine, it being noted that when the shutters are positioned generally, as shown in Fig. 11, and the sound is emitted from an amplifier toward the observer, such sounds will tend to be deflected in the direction of the left hand of the observer.

Although the gearing connection between the shaft 73 and the shutters 47, 48, 49 and 50 comprises miter gears in toothed engagement, it is to be understood that such connection may be otherwise effected, for instance, by worms in coöperative engagement with worm-gears, or by suitably correlated levers, and therefore it is not desired to limit this invention to the precise details of construction and arrangement herein set forth, as various modifications may be made therein without departing from the essential features of the invention as defined in the appended claims.

Having thus described my invention, I claim:

1. In a talking machine having a sound orifice, the combination with a pair of pivoted doors or shutters fitted to rotate in said orifice, of means rotatably mounted on an axis transverse to the axes of said shutters and operatively connected with each of said shutters to effect the contemporaneous relative rotation of said shutters in respectively opposite directions.

2. In a talking machine having a sound orifice, the combination with a plurality of pivoted doors or shutters fitted to close said orifice and mounted to rotate therein, of a shaft rotatably mounted on an axis transverse to the axes of said shutters, and means on said shaft connected with said shutters, to effect the contemporaneous relative rotation of predetermined groups of said shutters in respectively opposite directions.

3. In a talking machine having a sound orifice, the combination with a plurality of pivoted doors or shutters fitted to close said orifice when in alinement, of miter gears mounted on said shutters, an actuating shaft rotatably mounted on an axis transverse to the axes of rotation of said shutters, and miter gears on said shaft in toothed engagement with the miter gears on said shutters, the miter gears of the shutters on the opposite sides of the center of the sound orifice being respectively engaged upon the opposite sides of their axes of rotation by the miter gears on said shaft, to effect the opposite rotation of the sets of shutters.

4. In a talking machine having a sound orifice, the combination with a plurality of pivoted doors or shutters fitted within said orifice and having their respective edges abutted when disposed in alinement, of gearing correlatively engaged upon relatively different sides of their axes of rotation, to effect the contemporaneous rotation of certain selected shutters in one direction while rotating the other shutters in the opposite direction.

5. In a talking machine having a sound orifice in a wall thereof, and having recesses in said wall in communication with said orifice, the combination with a plurality of pivoted doors or shutters, bearings in said recesses for said shutters, gears on said shutters disposed in said recesses, an actuating shaft rotatively mounted in suitable bearings in said wall, gears on said shaft coöperating with the gears on said shutters and disposed in said recesses, the gears of the shutters on one side, and the gears of the shutters on the other side of the orifice being respectively engaged with the shaft gears in diametrically opposite relation, to effect the opposite rotation of the respective sets of shutters.

6. In a talking machine comprising a cabinet having a sound orifice and provided with recesses in the wall having said orifice, the combination with a plurality of pivoted doors or shutters fitted within said orifice, operative to close the same when disposed in alinement and respectively mounted to rotate about separate vertical axes, of bearings for said shutters disposed in said recesses, bevel or miter gears on said shutters disposed in said recesses, a shaft rotatively mounted in suitable bearings and extending through the wall of said cabinet adjacent to said orifice, miter gears on said shaft in mesh with the miter gears on said shutters and disposed in said recesses, the gears on selected shutters being engaged by the shaft gears on one side of their respective axis of rotation, and the gears on the other shutters being engaged by the shaft gears on the opposite side of their respective axis of rotation, and thumb-wheels on the ends of said shaft exterior to said casing whereby said shaft and shutters may be rotated.

7. In a talking machine, the combination with a casing providing a sound orifice, of sound reproducing means communicating with said orifice, and groups of doors or shutters arranged to control the passage of sound through said orifice, said doors or shutters being mounted to oscillate about parallel axes, and said doors or shutters in each of said groups being operatively connected to each other so that the doors or shutters in any group will be restrained to oscillate simultaneously in the same direction, and the doors of one of said groups being arranged so as to be oscillated in a predetermined direction while the doors of another of said groups are being oscillated in an opposite direction.

In witness whereof, I have hereunto set my hand this 12th day of December, A. D. 1912.

ELDRIDGE R. JOHNSON.

Witnesses:
 FRANK B. MIDDLETON, Jr.,
 DONALD G. WOLFF.